(12) United States Patent
McEwan et al.

(10) Patent No.: US 9,822,013 B1
(45) Date of Patent: Nov. 21, 2017

(54) SELECTIVE MINING ENHANCED RECOVERY PROCESS

(71) Applicants: John Sheldon McEwan, Oceanside, CA (US); Sandy DeBusschere, Carlyle (CA); Michael John Ferguson, North Saancih (CA); Max E. Ramey, Plaetas, NM (US)

(72) Inventors: John Sheldon McEwan, Oceanside, CA (US); Sandy DeBusschere, Carlyle (CA); Michael John Ferguson, North Saancih (CA); Max E. Ramey, Plaetas, NM (US)

(73) Assignee: Innovare Technologies Ltd., Carlyle (CA)

( * ) Notice: Subject to any disclaimer, the term of this patent is extended or adjusted under 35 U.S.C. 154(b) by 0 days.

(21) Appl. No.: 15/203,651

(22) Filed: Jul. 6, 2016

(51) Int. Cl.
| | | |
|---|---|---|
| *C01D 3/08* | (2006.01) |
| *E21B 43/28* | (2006.01) |
| *B01D 9/00* | (2006.01) |
| *F01K 7/16* | (2006.01) |
| *F01K 13/00* | (2006.01) |
| *F01K 17/02* | (2006.01) |
| *F01K 19/00* | (2006.01) |

(52) U.S. Cl.
CPC ............. *C01D 3/08* (2013.01); *B01D 9/0004* (2013.01); *E21B 43/28* (2013.01); *F01K 7/16* (2013.01); *F01K 13/006* (2013.01); *F01K 17/02* (2013.01); *F01K 19/00* (2013.01)

(58) Field of Classification Search
CPC ......... C01D 3/08; B01D 9/0004; E21B 43/28; F01K 7/16; F01K 3/006; F01K 17/02; F01K 19/00
See application file for complete search history.

(56) References Cited

U.S. PATENT DOCUMENTS

2015/0044113 A1  2/2015  Batty

*Primary Examiner* — Edward Johnson
(74) *Attorney, Agent, or Firm* — Plager Schack LLP; Mark H. Plager (57) ABSTRACT

Some embodiments of the present disclosure include a method and method for recovery of solution mined minerals. The method may include creating superheated steam using a steam boiler; passing the superheated steam through a turbine/generator to generate electricity; reheating the steam exiting the turbine/generator to saturation with a steam reheater; using the saturated steam with an absorption chiller to create chilled water; and recovering minerals using the chilled water in a cooling crystallizer system. In embodiments, the method and system may be used to recover minerals, such as potash (KCl), washing soda ($Na_2CO_3.10H_2O$); nahcolite ($NaHCO_3$); and glauber salt ($NaSO_4.10H_2O$). The method may utilize the trigeneration of steam, electrical, and chilled water utilities, which may be used for a recovery process.

8 Claims, 6 Drawing Sheets

SELECTIVE MINING ENHANCED RECOVERY PROCESS

BACKGROUND

The embodiments herein relate generally to selective mining, and more particularly, to a process for the enhanced recovery of solution mined minerals.

Solution mining is a mining method in which the mining of desired materials is achieved by the injection of a water, or a lean water solution, underground and into a known ore bed containing the desired mineral in a grade concentration that has been determined to be economically feasible for mining. The mineral is dissolved into the water and the rich water solution flows by pump pressure back to the surface and into a mineral recovery processing plant. A solution mining project can be, and has been, an alternative to conventional underground mining projects in which miners and mining equipment work underground to extract and bring to the surface ore in a solid form.

Conventional solution mining processes typically have lower equipment, personal, and maintenance costs than conventional underground mining. However, the energy requirement of the solution methods can be higher due to the need to pump and heat the injection water. Both the heating and pumping energy required is influenced greatly by the water circulation rate required for mining and process recovery. This rate is, in turn, influenced strongly by the mineral concentration difference between the lean injection water solution and the rich mine production water solution. A leaner injection solution and also a richer production solution would result in a reduced circulation rate required to meet the desired product production rate. This relationship mathematically increases exponentially with increased concentration difference.

Sylvinite ore is the most common type of potash containing ore and principally consists of potash minerals sylvinite (KCl) and the mineral halite (NaCl), but can also contain minor amounts of carnallite ($KCl.MgCl.6H_2O$), as explained in Garrett, D. E., "Potash: Deposits, Processing, Properties, and Use," $1^{st}$ Ed., Chapman & Hall, Chapter 1, page 1 (1996). The potash grade for commercially viable sylvinite mining for potash is typically about 20 wt. % potash with the remainder being principally halite.

Conventional Solution mining of sylvinite for potash is performed as primary mining, wherein the well injector fluid is almost pure water. This allows for a large KCl concentration difference and a reduced circulation rate, but due to a greater solubility for NaCl than KCl, more NaCl is mined than KCl, as shown graphically in FIG. 6. Typically, about 1.5 tons of NaCl are mined for every ton of KCl, which requires that the unwanted NaCl salt be removed from the solution and stockpiled so that the KCl content of the potash product can be recovered and processed with the typical 95 wt. % or greater product purity. Removal of the NaCl requires evaporation of the water, which is then condensed and used as the principal source of water in the well injection system. The evaporation is typically carried out in large industrial evaporators made of expensive corrosion resistant alloy metals, and additional separation equipment, such as hydroclones, centrifuges, and clarifiers, may also be needed to remove the precipitated NaCl salt formed in the evaporators. Thus, primary mining may require added equipment and energy.

Because of the added equipment and energy expenses related to primary mining, solution mining of sylvinite ore is also performed with an injection brine saturated with NaCl salt and under saturated with KCl, resulting in the unwanted NaCl being left in the mine and allowing for the mining of principally just the KCl contained in the sylvinite. This is known in the industry as secondary mining and takes place after sufficient surface area has been created in primary mined caverns. However, there is still the need to keep primary mining going to continually create and make available mine caverns for secondary mining. A typical conventional solution mining facility with both primary and secondary mining operations will produce about ⅔ of the potash from primary mining and about ⅓ from secondary mining.

With the advent of new well drilling techniques, such as horizontal drilling, to create larger amounts of surface area in the initial wellfield caverns, solution mining operations can now be constructed in which the entire plant production is produced with a saturated NaCl injection solution. This is known in the industry as selective mining.

The solution mining process currently in use for mineral recovery (as described in U.S. Patent Application Publication No. 2015/0044113 to Batty et al.) involves the evaporation of water in a multiple effector mechanical recompression evaporator prior to the cooling crystallization step. The evaporator precipitates the NaCl in a solid form and thereby separates it from the KCl that remains in solution. Water vapor from the evaporator is condensed and returned to the mine for continued mining. As described above, this is typically referred to as primary mining in the solution mining industry, which results in the mining of the unwanted NaCl salt, requiring larger capital and energy costs.

Crystallization of the KCl occurs next in a cooling crystallization step. Chilled water can be used for cooler crystallization temperatures during these processes, resulting in increased KCl recovery. However, conventionally, the chilled water is produced using compression chilling with refrigeration compressors. The electrical energy requirement for the compressors can increase the electrical requirements for the entire solution mining and process plant by as much as about 30%. This additional energy requirement in itself adds additional operating costs, but the cost can also be increased if the electrical energy is produced by a hydrocarbon burning utility company, wherein overall generation efficiency is limited to about 50% due to the need for cooling water condensing of the turbine exhaust steam.

In some parts of the world where cold climates persist longer during the year, the use of large outdoor cooling ponds provide the cooling for the KCl potash separation from the NaCl salt. See Garrett, page 316. In such cases, the precipitation of the solid KCl crystals generally takes place during the winter months, and dredges are used to slurry the precipitated KCl crystals to the process plant for potash recovery. Although the energy requirement for pond cooling is provided by nature, the yearly variance in the amount of KCl crystals generated requires the mining and recovery equipment be oversized for the maximum amount of crystal production that occurs during the coldest months. This can add as much as 25-50% to the size of the wellfield pumping and piping equipment, in addition to the plant recovery equipment that is needed for a cooling crystallizer system. Cooling ponds also require environmental monitoring and operating costs for pond leakage identification and control.

Therefore, what is needed is a process for the enhanced recovery of solution mined minerals that simultaneously reduces the cost of production for the recovery of the solution mined minerals by, for example, reducing the amount of energy and water required.

SUMMARY

Some embodiments of the present disclosure include a method for recovery of solution mined minerals. The method may include creating superheated steam using a steam boiler; passing the superheated steam through a turbine/generator to generate electricity; reheating the steam exiting the turbine/generator to saturation with a steam reheater; using the saturated steam with an absorption chiller to create chilled water; and recovering minerals using the chilled water in a cooling crystallizer system. In embodiments, the method and system may be used to recover minerals, such as potash (KCl), washing soda ($Na_2CO_3.10H_2O$); nahcolite ($NaHCO_3$); and glauber salt ($NaSO_4.10H_2O$). The method may utilize the trigeneration of steam, electrical, and chilled water utilities, which may be used for a recovery process.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The process of the present disclosure may be used to recover solution mined minerals and may comprise the following elements. This list of possible constituent elements is intended to be exemplary only, and it is not intended that this list be used to limit the process of the present application to just these elements. Persons having ordinary skill in the art relevant to the present disclosure may understand there to be equivalent elements that may be substituted within the present disclosure without changing the essential function or operation of the device.

1. Steam
2. Electrical Power
3. Chilled Water

The various elements of the process of the present disclosure may be related in the following exemplary fashion. It is not intended to limit the scope or nature of the relationships between the various elements and the following examples are presented as illustrative examples only.

As used herein, the following terms and nomenclature have the following definitions:

Solution mine: the wellfield pumping, equipment, and underground caverns as required for solution mining.

Wellfield: the area having one or more underground caverns used for solution mining.

Process plant: the surface equipment facilities engaged in the recovery of solution mined minerals.

Injection solution or injection water: the water or water solution leaving the process plant and pumped to the wellfield for continued solution mining.

Production solution or production brine: the water solution containing dissolved materials leaving the wellfield and returning to the process plant for mineral recovery.

Strong brine or rich water solution: a brine containing a higher concentration of mined minerals.

Weak brine or lean water solution: a brine containing a depleted amount of mined minerals due to mineral recovery.

Return brine: a weak brine returning to the mine wellfield at various points in the process for continued solution mining and mineral fortification.

Ton (t): metric ton, equivalent to 2204.6 pounds.

t/h: metric tons per hour.

t/y: metric tons per year.

Bar (a): absolute pressure in bars, equivalent to 14.5037 pounds per square inch.

By way of example, and referring to FIGS. 1-5, some embodiments of the present disclosure include a selective mining enhanced recovery (SMER) process, which uses novel techniques and processing equipment, as described herein, to decrease the brine concentration of KCl in the weak bring going to the mine wellfield and also recover more efficiently KCl in the mine production bring. Both effects reduce the brine circulation rate required to meet a desired potash production rate. The process may also result in increased energy and water efficiency as well as improved mine and process plan economics. Specifically, the SMER process of the present disclosure takes advantage of the lower mineral solubility limit produced by use of chilled water in a crystallization process.

Figure 1:
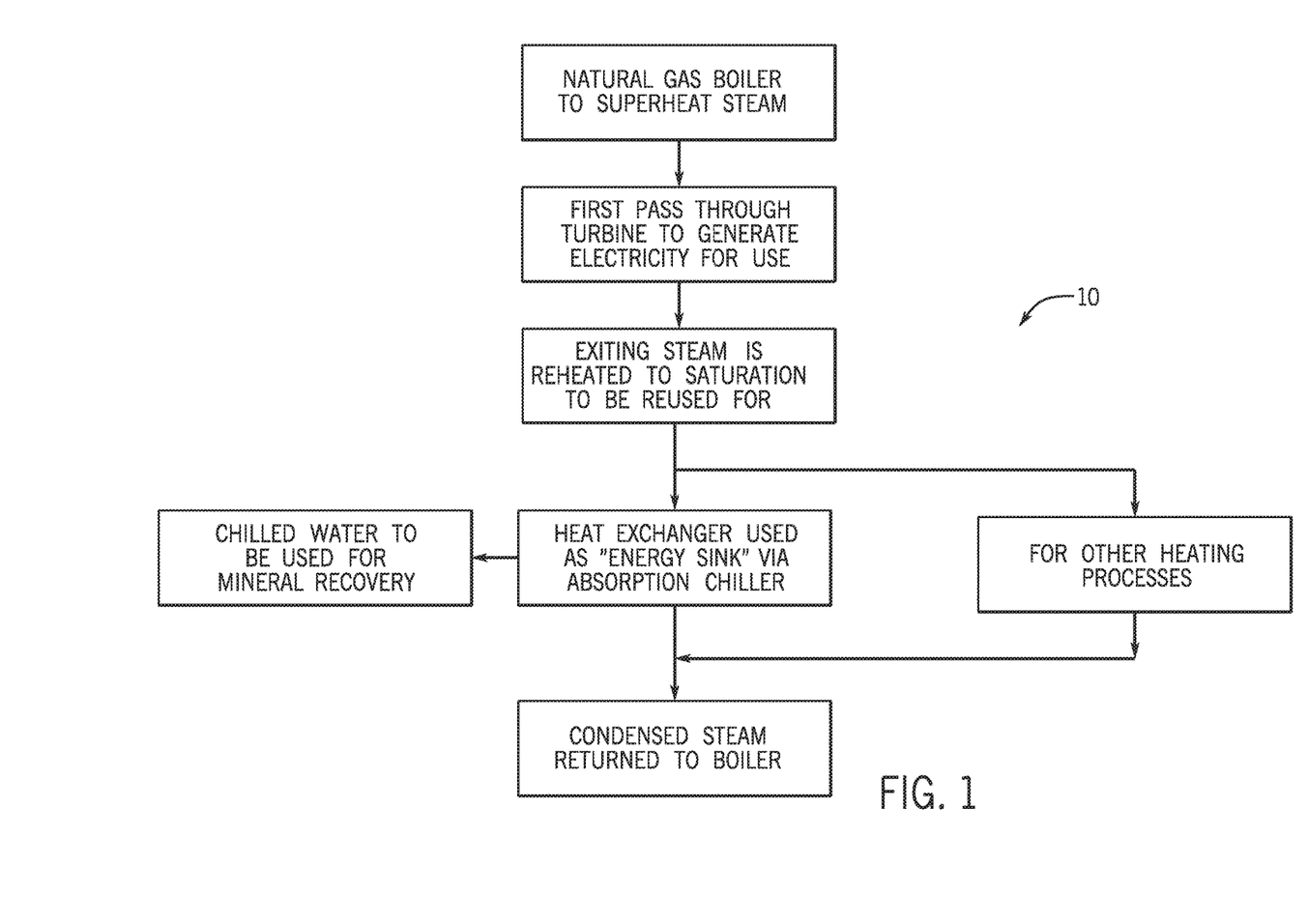
FIG. 1 is a flow chart of one embodiment of the present disclosure.

As shown in FIG. 1, the process 10 of the present disclosure may comprise creating superheated steam using a natural gas boiler; passing the superheated steam through a turbine to generate electricity; reheating the steam exiting the turbine to saturation, wherein a first portion of the steam is used in a heat to exchanger as an energy sink via an absorption chiller, creating chilled water, and a second portion of the steam is used for other heating purposes; returning condensed steam to the natural gas boiler; and using the chilled water formed by the absorption chiller for mineral recovery.

Steam may be produced in a natural gas fired steam boiler at a sufficient superheated pressure and temperature to first pass through a turbine generator for electrical generation. The exit steam for the steam turbine may then be reheated to saturated steam conditions and then used for process heating and to produce chilled water from an absorption type chiller, which becomes a useful energy sink for condensing the turbine/generator exit steam and the large heat of vaporization energy component of the steam is not lost. Although an absorption chiller by its self typically has a lower energy efficiency than compression chillers as measured by the ratio of the cooling capacity to the energy input (Coefficient of Performance or COP), the combination of an absorption chiller with a steam turbine/generator to produce electrical power, off-sets the inefficiency on an overall basis.

Figure 2:
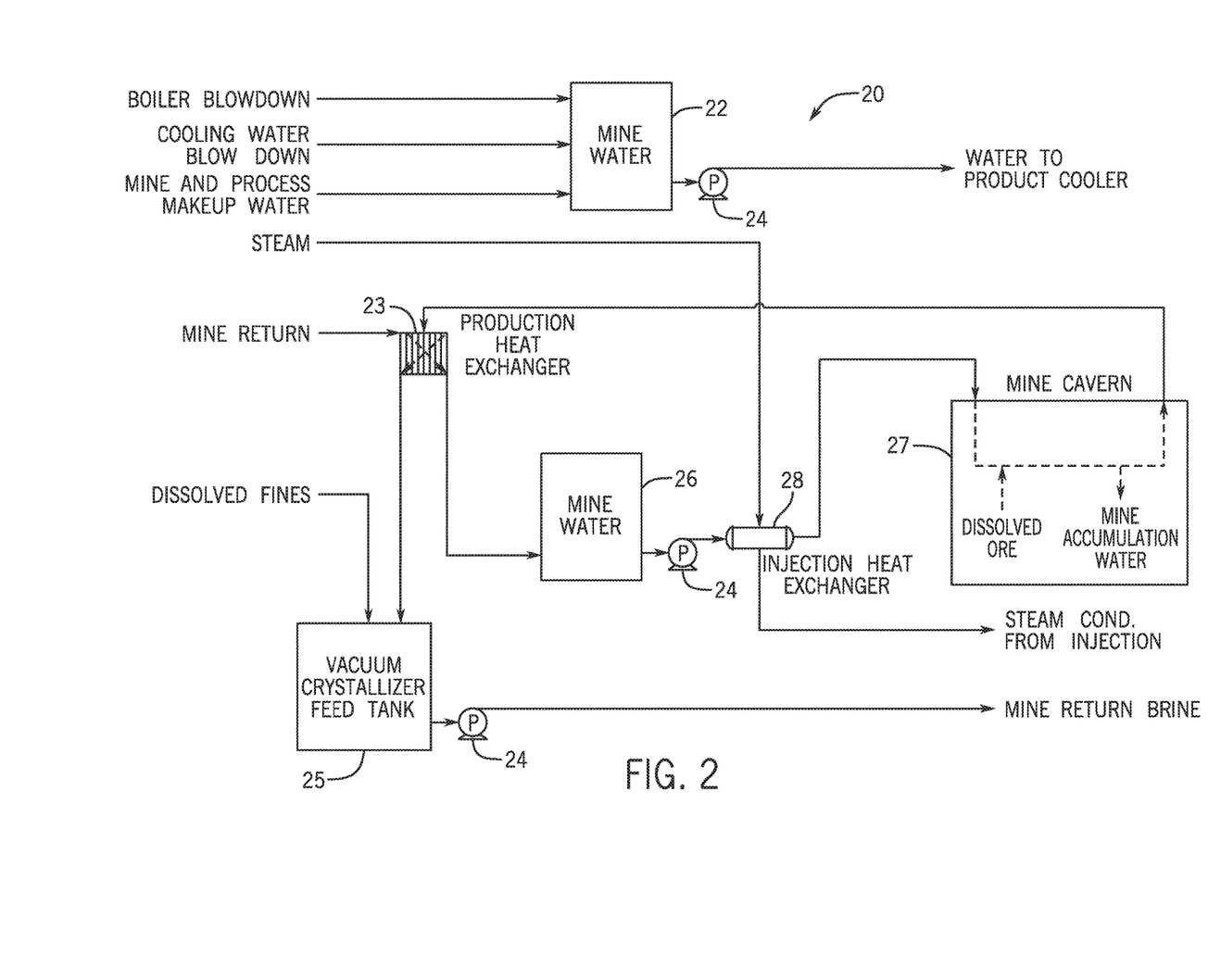
FIG. 2 is a block diagram of one embodiment of the present disclosure, showing mine and process plant circulation.

FIG. 2 shows an exemplary embodiment of the wellfield and process plant circulation for a typical secondary mining solution mine. As shown, boiler blowdown from a steam boiler, cooling water blowdown, and mine and process makeup water flow into mine water makeup tank 22 and pump 24 pumps the water from the mine water makeup tank 22 to a product cooler. This may augment the mine make-up water requirements, which may reduce the water requirement for the plant. Placing water make-up directly into the mine water makeup tank 22 may result in a reduced mineral concentration in the spent brine, which may result in an increased mining rate for a given circulation rate. For example, using the same calculation procedure as described in detail below, mass balance calculations indicate that the mine and process circulation may be increased by 3.75% if the process make-up water were placed elsewhere in the processing system. For a 250,000 t/y secondary mining potash plant operating at 8,000 hours per year and assuming a natural gas price of $1.8956 USD/gJ, this represents a cost savings of $22,000 per year or $883,000 for a plant designed for 40 years of operation.

As also shown in FIG. 2, spent mine return brine enters the mine return tank 26. From the mine return tank 26, the spent brine is heated in the injection heat exchanger 28 using steam. Condensed steam exits the injection heat exchanger 28. The brine output from the injection heat exchanger 28 enters the mine cavern 27. Dissolved ore is added to the brine in the cavern 27 while accumulation water (volume replacement water for the mined ore) is taken out of the brine, and the brine with dissolved ore leaves the mine cavern 27 and enters the production heat exchanger 23, where heat is exchanged with the returning spent brine before entering the vacuum crystallizer feed tank 25. Dissolved fines are also pumped into the vacuum crystallizer feed tank 25. The brine leaving the feed tank 25 is then sent to a vacuum crystallizer for an initial stage of brine cooling. Normally, no mineral crystallization takes place in the vacuum crystallizer. Rather, it is used to pre-concentrate the rich bring before cooling crystallization to improve energy efficiency.

Figure 3:
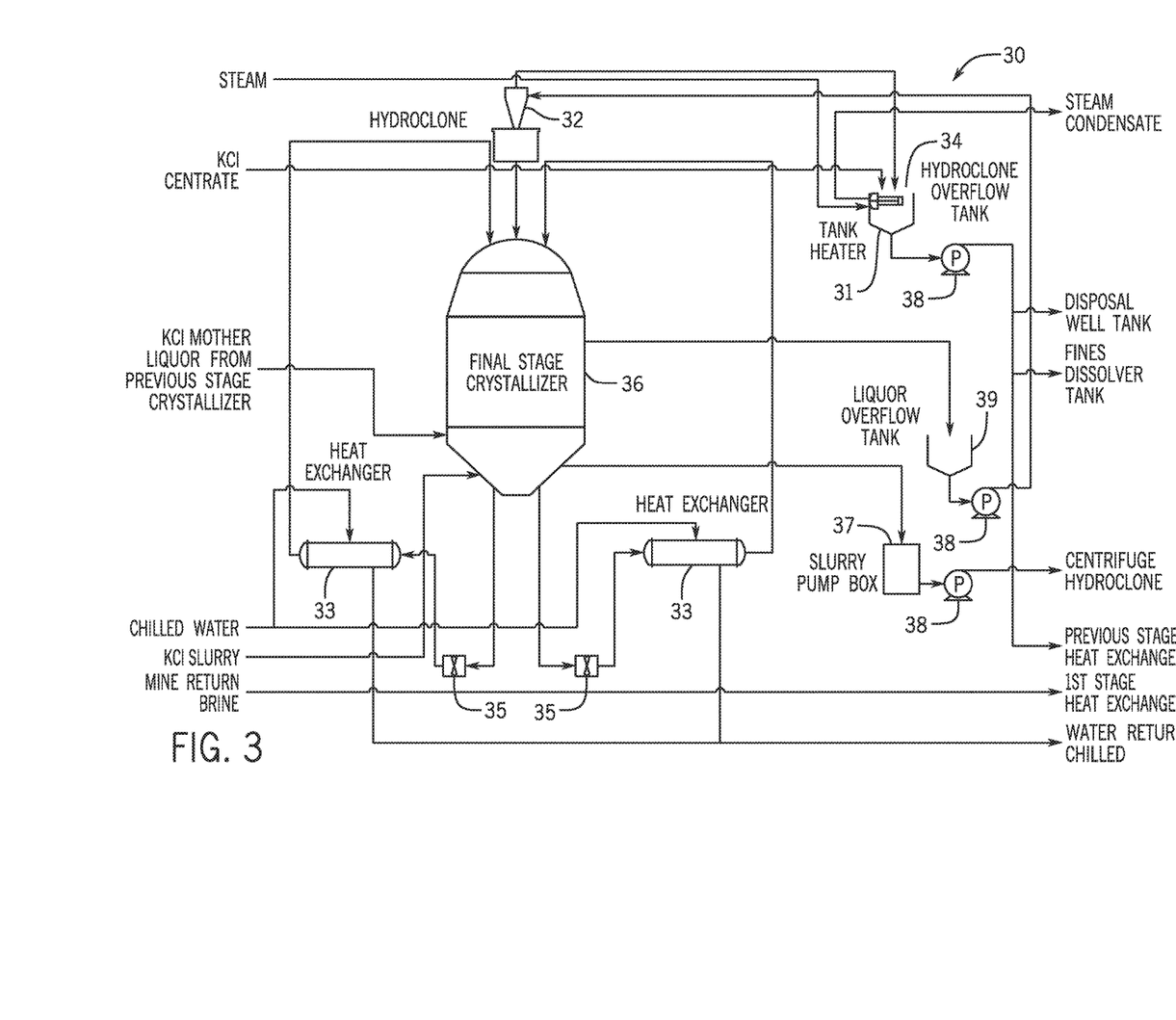
FIG. 3 is a block diagram of one embodiment of the present disclosure, showing the cooling crystallizers.

FIG. 3 shows the fourth stage of a 4 stage cooling crystallizer system operating in series from the first stage through the fourth stage. Chilled water from an absorption chiller supply pump enters the fourth stage crystallizer heat exchangers 33 and returns to a chilled water return tank (not shown). For the 250,000 t/y example mentioned above, chilled water at a temperature of 5° cools crystallizer circulating streams to a temperature of 7° C., which provides the cooling for the fourth stage surface cooled heat exchanger 33 to operate at a crystallization temperature of 10° C.

Also, for the 250,000 t/y example, mine return brine from the fourth stage crystallizer 36 provides the brine cooling for the third stage crystallizer (not shown). In the same fashion, mine return brine provides the cooling required for the second and first stage crystallizers. The overall temperature drop for the production brine leaving the vacuum crystallizer through the fourth stage crystallizer 36 is 33° C. (43° C.-10° C.). Thus, the cooling required may be provided entirely from the absorption chiller with the SMER process of the present disclosure.

While the process is described above as including a 4 stage cooling crystallizer system the SMER process of the present disclosure may work for any number of crystallizers. However, the overall energy required for crystallization may come more efficient with more stages of cooling due to the mine return brine and production brine heat exchange.

Figure 4:
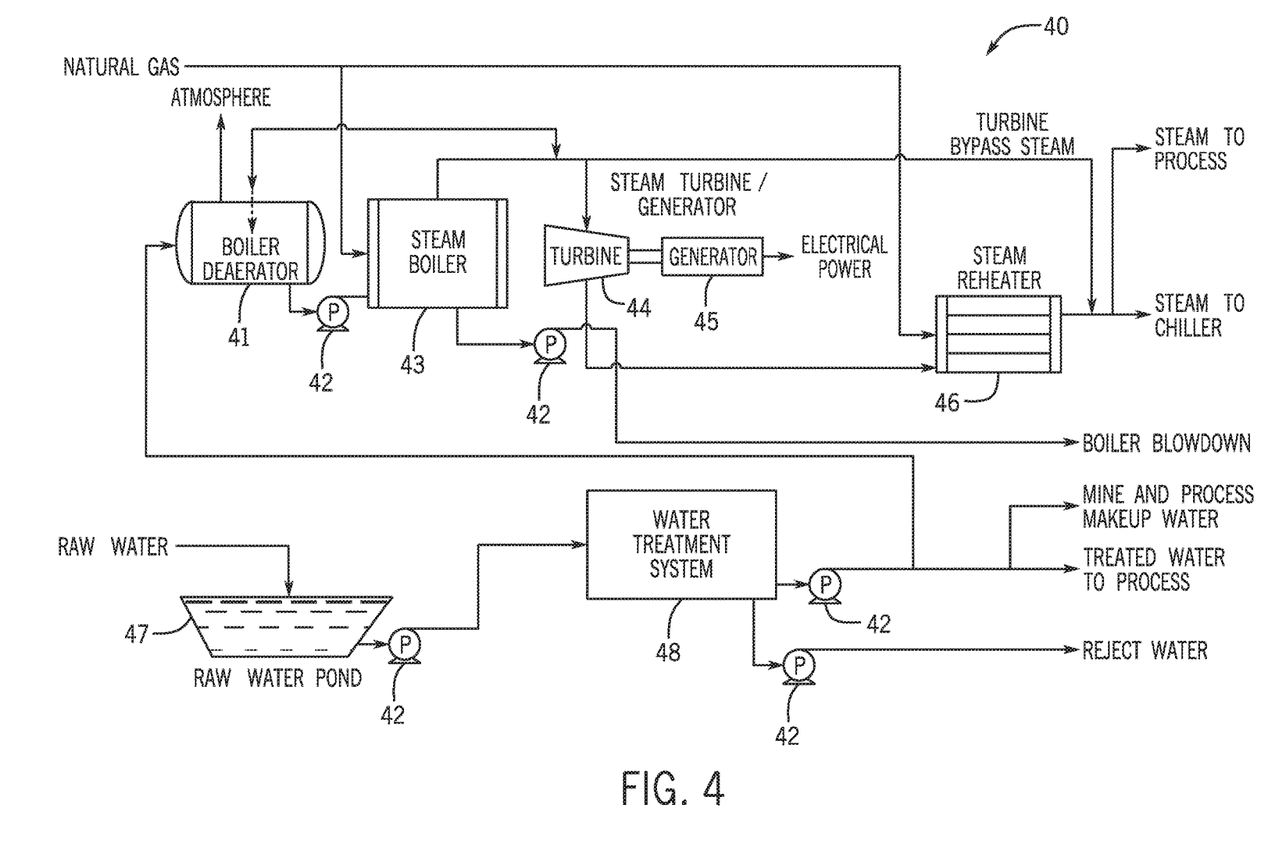
FIG. 4 is a block diagram of one embodiment of the present disclosure, showing the steam and electrical utilities.
Figure 5:
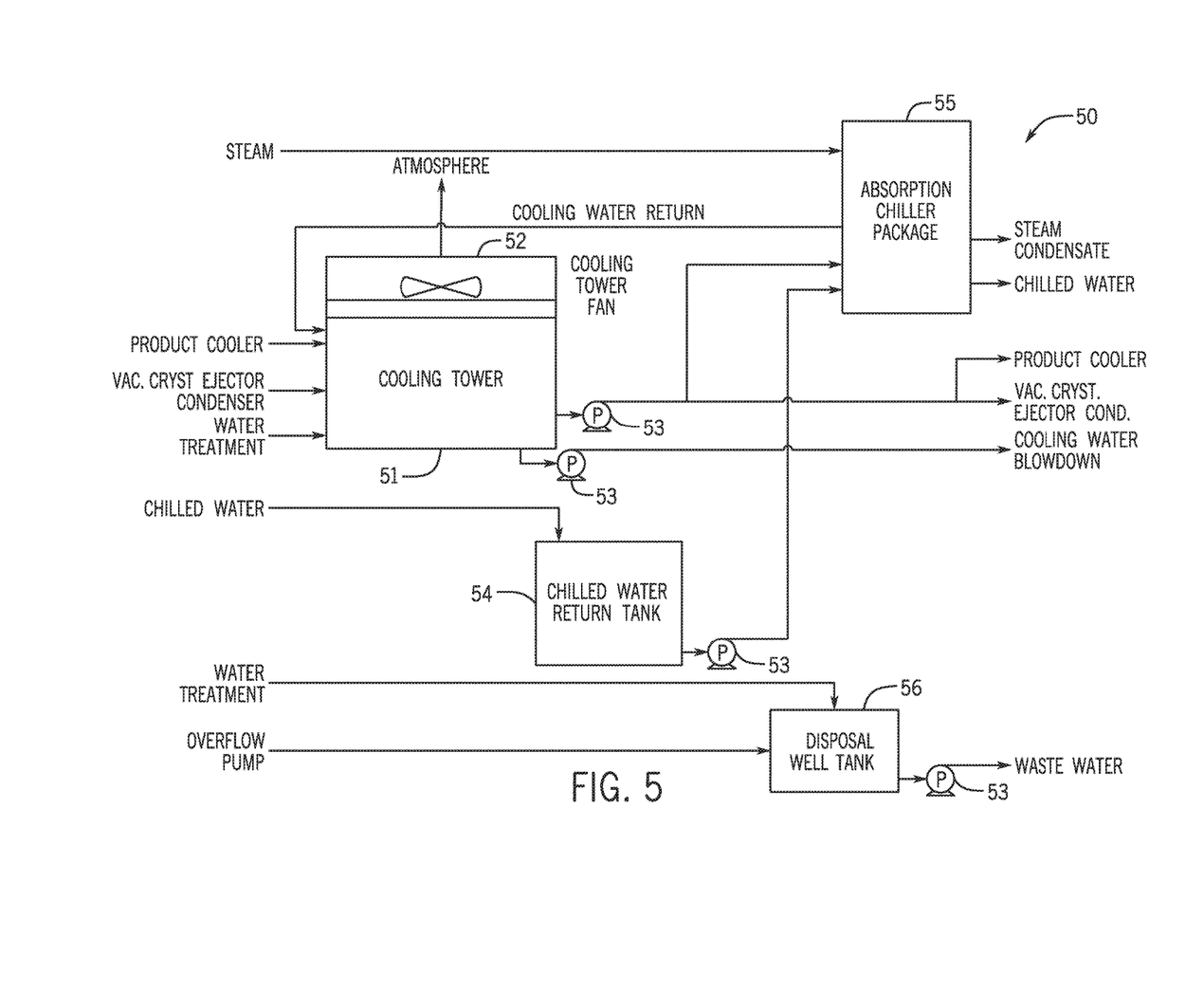
FIG. 5 is a block diagram of one embodiment of the present disclosure, showing the chilled water generation and disposal system.

FIG. 4 depicts an exemplary steam and electrical generation process for the SMER process of the present disclosure. As shown in FIG. 4, natural gas steam may have a first portion of the natural gas burned in a boiler burner in steam boiler 43 to produce steam. Steam from the boiler 43 may be sent to the steam turbine/generator 44, 45 to generate electrical power. Steam required for mining and processing purposes, but not needed for electrical generation, may bypass the turbine/generator 44, 45 and may, for example, be sent to the injection heat exchanger 28 as shown in FIG. 2 or the absorption chiller 55 as shown in FIG. 5. Thus, only the electrical power requirement necessary to meet the needs of the plant may be generated.

Steam exiting the turbine/generator 44, 45 may be reheated to saturated steam conditions in steam reheater 46. The reheated steam may be combined with the turbine/generator bypass steam and then sent to plant distribution. A second portion of natural gas may be burned in the reheater burner 46 to supply the energy for steam reheating. This energy requirement may be calculated as the energy extract by a constant entropy expansion, or polytropic expansion, across the steam turbine.

For example, for a 250,000 metric ton per year selective mining potash plant using the SMER process of the present disclosure, the steam boiler 43 may generate 47.9186 t/h of steam at a pressure of 50 bar (a) and a temperature of 385° C., and 47.0378 t/h of steam may pass through the turbine/generator 44, 45 and generate 8.08 mW of electrical power. Steam exiting the turbine/generator 44, 45 at a pressure of 5 bar (a) may be reheated to the saturated steam temperature of 151.84° C. in the steam reheater 46. The reheated steam may be combined with 0.2192 t/h of turbine/generator bypass steam that has been reduced to 5 bar (a) across a pressure control valve. The combined steam may then flow to the plant steam distribution piping to meet the plant steam requirements. As shown, 11.1596 t/h of steam may be sent to the absorption chiller for chilled water generation, completing the trigeneration of utilities (steam, electrical power, and chilled water) that may be required for selective solution mining in accordance with the process of the present disclosure.

FIG. 5 shows the equipment components and streams for the generation of chilled water for cooling crystallization. The chilled water may be generated in absorption chiller package 55. An absorption chiller may use a circulating water solution of a chemical compound known to have the capability to rapidly absorb water. For example, a solution of lithium bromide (LiBr), having a weight range of 50% to 55% in water, may be used as the absorption solution.

The absorption of water in the water chiller may create a refrigeration vacuum that, in turn, cools a closed loop of circulating chilled water to be used for processing. Steam, or hot water, may be used to regenerate the lean or "weak" solution of LiBr after water absorption and reconstitute the "strong" LiBr solution for reuse as the water absorbent. Cooling water may be used to re-condense the water removed from the weak LiBr solution by the steam heat exchanger. The condensed water may remain in the absorption chiller package 55 and may be reused to constitute LiBr absorption solution.

As shown in FIG. 5, steam and cooling water enter the absorption chiller package 55. The chilled water returns and leaves the absorption chiller package. As an example of an absorption chiller operation for a 250,000 metric ton per year selective mining potash plant, the chilled water requirement may be 8,598.45 t/h and may enter and exit the absorption chiller package at 6.1° C. and 5.0° C. respectively. The cooling water requirement may be 2297.5 t/h entering the chiller package at 21.1° C. and exiting at 27.2° C.

FIG. 5 also shows the disposal system design for the SMER process. Purge from the fourth effect crystallizer system, is sent to the disposal well tank 56. As previously stated, the vast majority of the NaCl brine leaving the wellfield may be returned to the wellfield via the mine return brine. However, a small portion may leave the system as part of the crystallizer purge steam. The steady-state design for a SMER process for the production of 250,000 tons of KCl per year may be 0.86 t/h of NaCl in the purge stream. The total NaCl salt leaving the wellfield in the production brine may be 162.28 t/h. This results in 0.53% of the mined NaCl leaving the system with the purge stream. The amount of NaCl leaving may be varied, however, by increasing the purge rate. This in turn will result in more NaCl mining in the wellfield mine cavities, which will increase the ore permeability and surface area for solution mining. Therefore, if the concentration of the desired mineral decreases due to varying mineral ore grades, temporarily increasing the purge rate becomes a useful tool for restoring the mineral concentration in the production brine to the desired level.

In embodiments, the SMER process also incorporates a method for controlling the rate at which the permeability of the ore body can be controlled, which is accomplished by allowing more NaCl salt to be mined and disposed of in the process purge system. Increasing the NaCl mined to a slight extent may help to increase the KCl concentration due to increased water permeability in the well cavern.

The process of the present disclosure may be used as a low energy and reduced water requirement process for the recovery of minerals from a water solution mining process. For example, for the recovery of potash (KCl) from sylvinite, an ore containing both KCl and NaCl, the process may produce a lower energy and, thus, lower operating cost for the selective mining of just the KCl mineral, thereby leaving the preponderance of the unwanted NaCl in the underground mining cavity.

Figure 6:
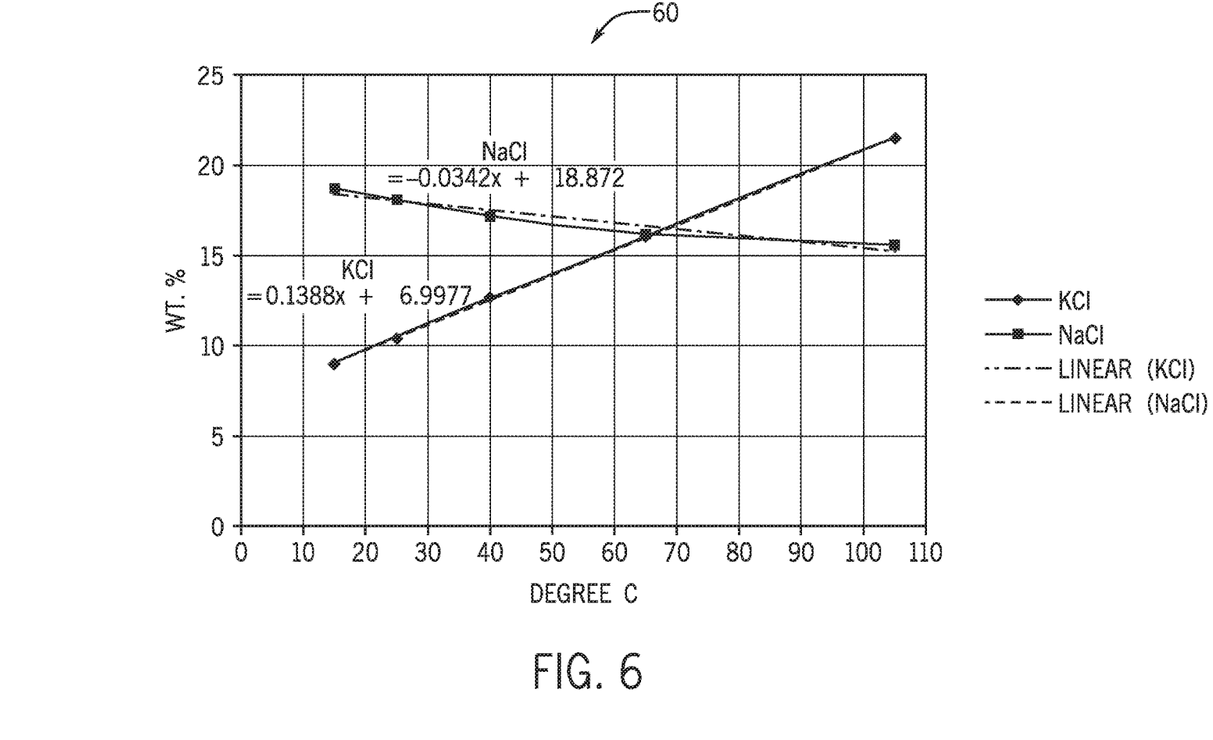
FIG. 6 is a graph showing the relation of the solubility limit with temperature for a solution containing NaCl and KCL and a typical 2 wt. % $MgCl_2$.

Solution mining processes involve the return of the spent brine after the recovery process back to the mine for continued mineral mining. For minerals having normal water solubility with respect to temperature (i.e., lower temperatures produce lower solubility limits), the SMER process may also result in lower heating and pumping energy requirements by requiring that a lower amount of recycled spent brine be sent back to the solution mine to produce the desired amount of plant product due to the enhanced mineral recovery associated with the use of chilled water for the crystallization process. The colder chilled water results in a lower mineral solubility limit in the crystallizer brine and hence additional recovery of solid crystallized mineral. A relationship of mineral solubility with temperature is shown in FIG. 6, where it can be seen that KCl has a normal solubility relationship, whereas NaCl has a slightly inverse solubility relationship with temperature. The solubility data assumes a magnesium chloride ($MgCl_2$) of 2 wt. %. $MgCl_2$ is a trace mineral typically found in sylvinite ore deposits.

Mining with a brine already saturated with NaCl avoids the mining of additional NaCl and allows for selectively mining the KCl potash only. However, because the mine return brine also contains some dissolved KCl in solution, a greater brine circulation rate than that required for primary mining is conventionally need to achieve the same desired amount of potash production. The SMER process of the present disclosure offsets this difference by an appreciable extent by improving the economics for chilled water cooling (or a chilled salt brine cooling) in the crystallizer to increase the rate of mineral recovery. For example, rigorous mass balance calculations developed for solution mining wellfield circulation resulted in a 30% higher circulation flowrate for a crystallizer operating at 20° C. versus a crystallizer operating at 10° C. This, in turn, means that the heating and pumping for the wellfield injection stream will also be increased by 30%. From the derivation of rigorous solution mining mass balance calculations that take into account both mined volume brine fill requirements and multiple mined minerals, mathematical calculations indicate a natural gas cost savings of $673,500 per year for a 250,000 t/y potash plant. For a 40 year plant life, this represents a total savings of $26,938,000. The calculations are presented as follows:

The derivation of simultaneous mathematical equations that describe the mass balance behavior for solution mined wells, were developed by J. S. McEwan and M. Ramey and published in a peer-reviewed mining journal. See McEwan, John S. and M. Ramey, *Solution Mining Mass Balance Calculations*, Mining Engineering, September 2010 at page 65. As presented in that publication, the set of simultaneous equations can be reduced to four equations as follows:

$$Zi = C2i\Sigma Zi - V1\rho 1)C1i - C2i) \quad \text{Eq. 1}$$

$$Z = \Sigma Zi \quad \text{Eq. 2}$$

$$V2 = [V1\rho 1 + Z - (Z/\mu m)*\rho 2]/\rho 2 \quad \text{Eq. 3}$$

$$Zneti = \text{net mining rate} = C2iV2\rho 2 - C1iV1\rho 1 \quad \text{Eq. 4}$$

Where:
 $Zi$=individual mined mineral i–Kg/h
 $Z$=total minerals mined–kg/hr.
 $V2$=theoretical outlet flowrate–m3/hr
 $V1$=inlet volume flowrate–m3/hr
 $C1i$=inlet product mineral concentration, wt. %/100
 $C2i$=outlet product mineral concentration, wt. %/100
 $\rho 1$=inlet density–kg/l or $t/m^3$
 $\rho 2$=outlet density–kg/l or $t/m^3$
 $\rho m$=weighted average mineral density–kg/l or $t/m^3$
Computer Trial and Error Procedure For a given set of know conditions, the unknown well outlet volume can be solved by a computer trial-and-error procedure as follows:
 1 Assume Z
 2 Calculate Zi from Eq. 1
 3 Calculate Z from Eq. 2
 4 Calculate error=Z assumed−Z calculated
 5 Guess new Z until error <1 kg/h
 Once Z has been determined, the outlet volume V2 can be calculated form Eq. 3. The net mining rate for each mineral i can then be found from Eq. 4.

From FIG. 6, it can be seen that the solubility limit for a 20° C. KCl solution is 9.77 wt. % becomes the value of C1 in the above equations. Solving the above equations using this value results in a circulation rate (V1) of 789.75 m³/h to produce a net mining rate of KCl of 21,865 kg/h or 250,000 t/y.

Also from FIG. 6, it can be seen that the solubility limit for a 10° C. KCl solution is 8.39 wt. %. Equation solving using this value for C1 produces a circulation volume V1 of 551.85 m³/h. This represents a 30.1% reduction in flowrate: (789.75−551.85)/789.75×100=30.1%.

The heat capacity for a KCl brine at approximately 8 wt. % and 50° C. temperature is 0.91 (cal.-g)/° C. (calorie-gram per ° C.) see Garrett page 628. Using a conversion factor of 4.1868 J (Joule) per cal.-g/° C. converts the heat capacity to 3.81 J/° C. Using this heat capacity value results in an energy requirement of 147,419 mJ/h to heat the injection brine from 20° C. to 70° C. at a flowrate of 789.75 m$^3$/h (773.86 t/h). For a 30.1% reduction in flowrate, the energy savings is 44.41 gJ/h.

From the US Energy Information Administration, the Henry Hub monthly average natural gas price for 1$^{st}$ Quarter 2016 was $2.00 USD/million BTU see US Energy Information Administration. Using a conversion factor of 0.9478 gJ (giga Joules) per million BTU, this price converts to $1.8956 USD/gJ. For a plant and wellfield operational rate of 8,000 hours per year, the 30.1% reduction in well filed circulation rate represents a cost reduction of $673,500 USD per year (44.41×8,000×$1.8956) or $62,487,000 for a 40 year plant operation.

While the process described above primarily discusses the solution mining of potash, the system and process of the present disclosure may also be used to recover solution mined washing soda ($Na_2CO_3.10H_2O$); nahcolite ($NaHCO_3$); and glauber salt ($NaSO_4.10H_2O$).

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method for selective mining recovery, the method comprising:
    creating superheated steam using a member selected from the group consisting of a steam boiler and a natural gas fired turbine/generator;
    passing the superheated steam through a turbine/generator to generate electricity;
    reheating the steam exiting the turbine/generator to saturation with a steam reheater;
    using the saturated steam with an absorption chiller to create chilled water; and
    recovering minerals using the chilled water in a cooling crystallizer system.

2. The method of claim 1, wherein:
    a first portion of the steam is used in a heat exchanger as an energy sink via the absorption chiller, creating the chilled water; and
    a second portion of the steam is used for other heating purposes.

3. The method of claim 1, wherein the minerals are a member selected from the group consisting of potash (KCl), washing soda ($Na_2CO_3.10H_2O$); nahcolite ($NaHCO_3$); and glauber salt ($NaSO_4.10H_2O$).

4. The method of claim 1, further comprising:
    selective solution mining of sylvinite using a NaCl brine solution; and
    recovering potash from the solution mined sylvinite.

5. The method of claim 4, further comprising varying the amount of salt mined in conjunction with the potash to control permeability of a sylvinite ore body being solution mined for production of the potash.

6. A method for selective mining recovery, the method comprising:
    creating saturated steam using a steam boiler;
    passing the saturated steam through a turbine/generator to generate electricity;
    reheating the steam exiting the turbine/generator to saturation with a steam reheater;
    using the reheated saturated steam with an absorption chiller to create chilled water; and
    recovering minerals using the chilled water in a cooling crystallizer system.

7. The method of claim 6, wherein the minerals are a member selected from the group consisting of potash (KCl), washing soda ($Na_2CO_3.10H_2O$); nahcolite ($NaHCO_3$); and glauber salt ($NaSO_4.10H_2O$).

8. The method of claim 6, further comprising:
    selective solution mining of sylvinite using a NaCl brine solution; and
    recovering potash from the solution mined sylvinite.

* * * * *